(12) United States Patent
Kaneko

(10) Patent No.: US 6,950,443 B1
(45) Date of Patent: Sep. 27, 2005

(54) ENCODING APPARATUS, ENCODING METHOD, AND RECORDING MEDIUM STORING ENCODING PROCESSING PROGRAM

(75) Inventor: Yushi Kaneko, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/487,312

(22) Filed: Jan. 19, 2000

(30) Foreign Application Priority Data

Jan. 22, 1999 (JP) .................................. 11-013907

(51) Int. Cl.[7] .............................................. H07J 3/24
(52) U.S. Cl. .................. 370/474; 370/465; 370/471; 375/240.01; 375/240.12; 375/240.16; 375/240.24; 375/240.26; 348/441
(58) Field of Search ............................... 370/465, 474, 370/470–471; 348/441; 375/240.01, 240.12, 375/240.16, 240.24, 240.26, 240.23

(56) References Cited

U.S. PATENT DOCUMENTS

| 5,631,888 | A | * | 5/1997 | Itoh et al. ...................... 369/60 |
| 5,801,781 | A | * | 9/1998 | Hiroshima et al. ......... 348/441 |
| 5,895,123 | A | | 4/1999 | Fujii et al. ..................... 386/96 |
| 6,333,950 | B1 | * | 12/2001 | Karasawa .............. 375/240.23 |

* cited by examiner

Primary Examiner—Chi Pham
Assistant Examiner—Ronald Abelson
(74) Attorney, Agent, or Firm—Fitzpatrick, Cella, Harper & Scinto

(57) ABSTRACT

In an encoding apparatus or method, variable-length encoding data is packetized by a packetizing format in which a header of a packet has an area for indicating a packet length and the range of values indicating the packet length is limited. Variable-length encoding data is input and the data length of the variable-length encoding data is detected. According to the detection result, the input variable-length encoding data is packetized within the packet-length maximum value which can be specified in the header.

9 Claims, 5 Drawing Sheets

ENCODING APPARATUS, ENCODING METHOD, AND RECORDING MEDIUM STORING ENCODING PROCESSING PROGRAM

BACKGROUND OF THE INVENTION

1. Field of the Invention

The present invention relates to encoding processing suited to packetize variable-length encoding data.

2. Description of the Related Art

As compression encoding methods for compressing video and audio data in a digital form, Moving Picture Experts Group (MPEG) methods have been internationally standardized. The MPEG is a group for examining moving-picture encoding methods for storage in a sub committee 29 (SC29) of a Joint Technical Committee 1 (JTC1) in the International Organization for Standardization/International Electrotechnical Commission (ISO/IEC). The MPEG methods include a MPEG-2 method (ISO 13818).

In the MPEG-2 method, transfer formats for encoding video and audio data are specified. They include an elementary stream (ES) indicating compression codes of video and audio data, a packetized elementary stream (PES) indicating packetized ESs, and a transport stream (TS) serving as a format for multiplexing a plurality of PESs.

In the header information of a PES, a 33-bit field called a presentation time stamp (PTS) can be inserted. This time information indicates timing when video and audio data is output after an ES including the video and audio data is decoded in a decoding section. As for video data, this information indicates a time when a picture appearing first after the PTS is received is output.

Only one PTS can be disposed in one PES. Therefore, it is preferred that one PES be formed of at most one picture when ESs are packetized. If one PES is formed of more than one picture, for example, if one PES is formed of two pictures, since only one PTS can be provided, an error may occur in the decoding section.

The header information of a PES includes a 16-bit field called PES_packet_length. This field expresses a value from 0x0001 (1) to 0xffff (65535) (0x indicates a hexadecimal notation), and indicates the length of data stored in the PES. As an exception, a value of 0x0000 (0) is allowed in a video PES to mean that a data length is not specified.

The number of data items in one picture differs according to the type of the picture. An I picture, which is an intra-coded picture, for example, has several times as many data items as in a P picture (forward-direction predictive-coded picture) and a B picture (bidirectionally predictive-coded picture), which are inter-coded pictures. Therefore, the length of data may exceed 0xffff, specified in PES_packet_length. In this case, 0x0000 is specified in PES_packet_length.

In the MPEG-2 method, to generate TSs, PESs are divided into portions each having 182 bytes, which is the maximum number of data items which can be stored in a TS, and the portions are placed in a plurality of TSs. If the last portion does not exactly fit in the last TS, which also has 182 bytes, stuffing bytes are inserted before the last portion to fill the last TS.

Therefore, when 0x0000 is specified in PES_packet_length, the data length of a PES cannot be determined until the next PES is input. Consequently, a PES-header detector for detecting a PES header, a buffer for delaying PES data by 182 bytes at most, and a data-length counter for counting the data length of a PES are required to generate TSs. In addition, processing for inserting stuffing bytes and for placing delayed PES data to generate TSs according to PES-header detection and a data-length count is required.

As described above, when the number of data items in one PES exceeds 0xffff, PES_packet_length in the PES header is set to 0x0000. Therefore, in a subsequent TS generation processing, the data length of the PES cannot be determined. The above-described processing is required for TS generation. It is therefore difficult to make an encoding apparatus compact and an encoding speed fast.

SUMMARY OF THE INVENTION

Accordingly, it is an object of the present invention to provide an encoding apparatus, an encoding method, and a recording medium in which an encoding processing program is recorded, which allow a TS processing circuit to be simple, TS processing to be made fast, and an encoding apparatus to be made compact.

The foregoing object is achieved in one aspect of the present invention through the provision of an encoding apparatus for packetizing variable-length encoding data by a packet format in which a header of a packet has an area indicating the length of the packet and the range of values indicating the packet length is limited, the encoding apparatus including input means for inputting variable-length encoding data; detection means for detecting the data length of the variable-length encoding data; and packetizing means for packetizing the variable-length encoding data according to the output of the detection means such that the packet length is set within the maximum value which can be specified in the header.

The foregoing object is achieved in another aspect of the present invention through the provision of an encoding method for packetizing variable-length encoding data by a packet format in which a header of a packet has an area indicating the length of the packet and the range of values indicating the packet length is limited, the method including the steps of inputting variable-length encoding data; detecting the data length of the variable-length encoding data; and packetizing the variable-length encoding data according to the output of a detection such that the packet length is set within the maximum value which can be specified in the header.

The foregoing object is achieved in yet another aspect of the present invention through the provision of a recording medium which can be read by a computer and which records a program for packetizing variable-length encoding data by a packet format in which a header of a packet has an area indicating the length of the packet and the range of values indicating the packet length is limited, the program including input processing for inputting variable-length encoding data; detection processing for detecting the data length of the variable-length encoding data; and packetizing processing for packetizing the variable-length encoding data according to the output of a detection such that the packet length is set within the maximum value which can be specified in the header.

Other objects, features, and advantages of the invention will become apparent from the following detailed description taken in conjunction with the accompanying drawings.

DESCRIPTION OF THE PREFERRED EMBODIMENTS

Figure 1:
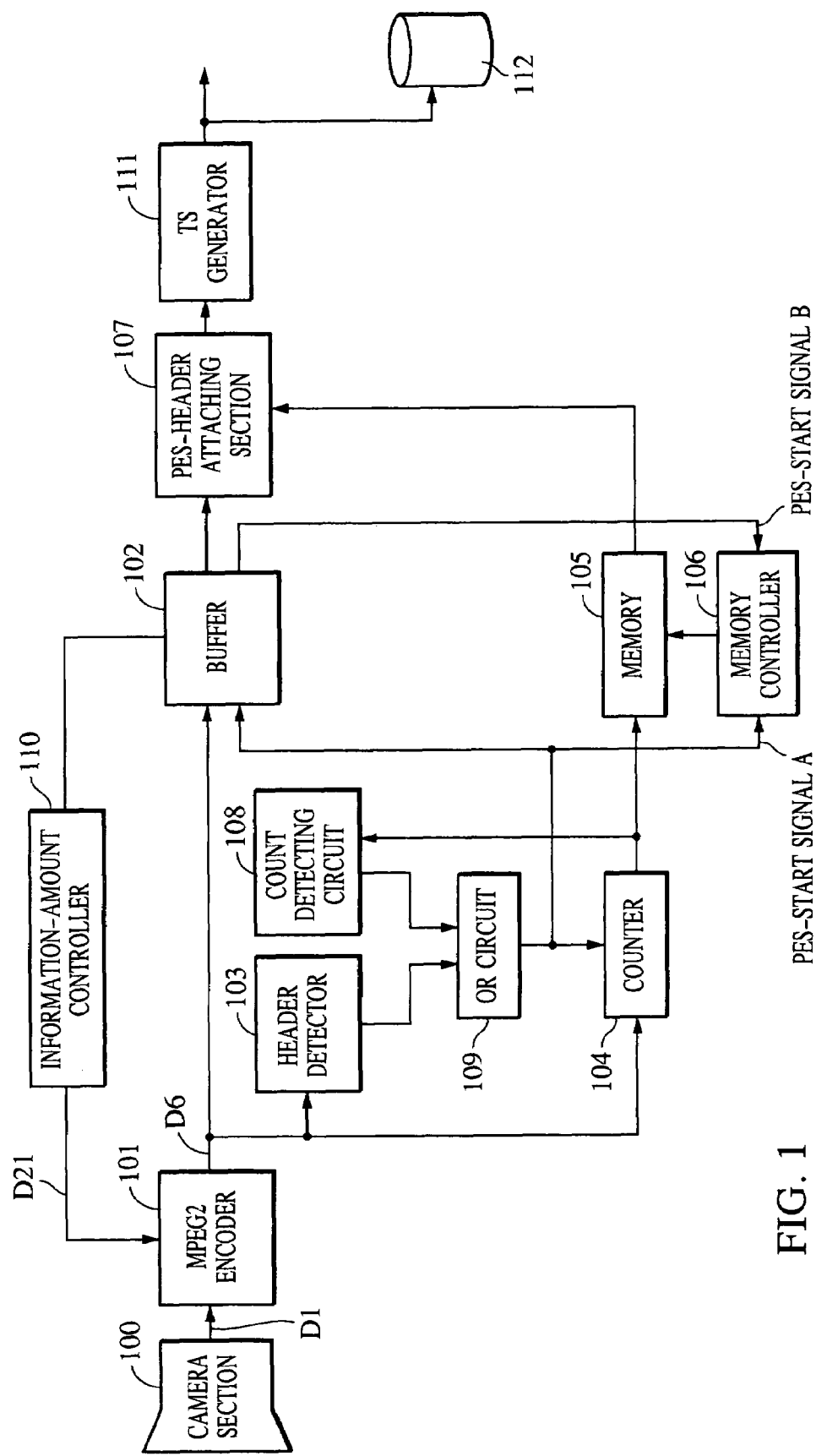
FIG. 1 is a block diagram of an image encoding apparatus for packetizing elementary streams according to an embodiment of the present invention.

Embodiments of the present invention will be described below by referring to the drawings.

First Embodiment

FIG. 1 is a block diagram of an image encoding apparatus for packetizing elementary streams according to an embodiment of the present invention.

In FIG. 1, there are shown a camera section 100 for capturing an image of an object and for generating a video signal, an MPEG-2 encoder 101, a data buffer 102 for maintaining a fixed rate of an elementary stream (ES), a header detector 103 for detecting the header of an ES, a counter 104 for counting data length, a memory 105 for storing a packetized elementary stream (PES) header, a memory controller 106 for controlling the memory 105, a PES-header attaching section 107 for attaching a PES header, a count detecting circuit 108 for determining whether the count of the counter 104 matches a predetermined value, a two-input OR circuit 109 for generating a PES-start signal A, an information-amount controller 110 for generating a control signal for code-amount control according to the occupation rate of data stored in the data buffer 102 and for sending the signal to the MPEG-2 encoder 101, and a TS generator 111 for generating TS packets by dividing PESs by 182 bytes.

The operation of the image encoding apparatus will be described next. Image data captured by the camera section 100 is encoded by the MPEG-2 encoder 101 to generate an ES conforming to the MPEG-2 specification and to output it.

A structure of the MPEG-2 encoder 101 will be described by referring to FIG. 2.

Figure 2:
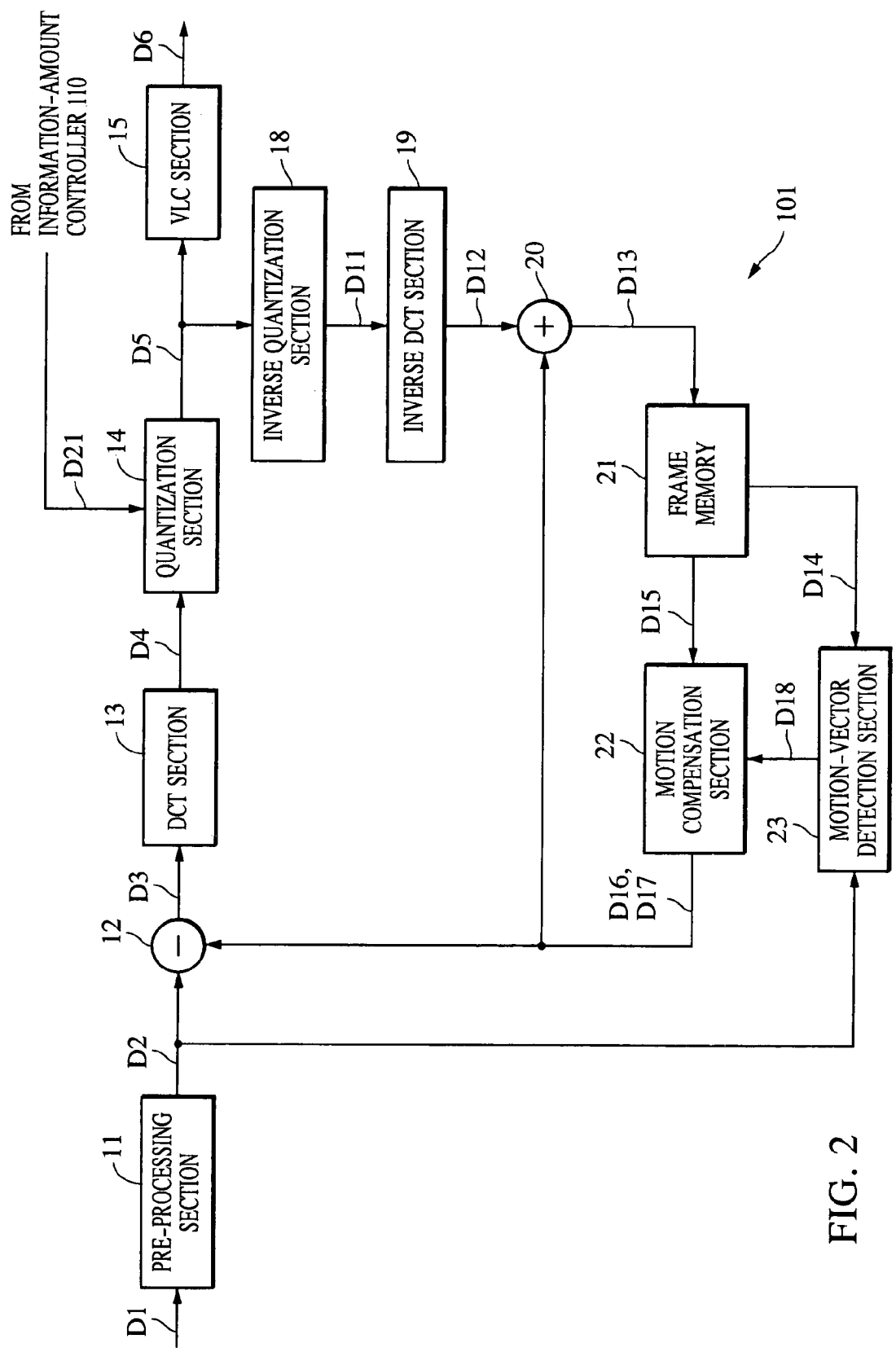
FIG. 2 is a block diagram of an MPEG-2 encoder 101 shown in FIG. 1.

FIG. 2 is a block diagram showing the structure of the MPEG-2 encoder 101.

In FIG. 2, image data D1 generated by the camera section 100 is input to a pre-processing section 11. The pre-processing section 11 specifies the type of each frame picture in the image data D1 sequentially input, among three image types, an I picture, a P picture, and a B picture; rearranges the frame pictures in the image data D1 in the order in which the frame pictures are to be encoded according to the image types of the frame pictures; divides each frame picture into macroblocks each formed of luminance signals in 16 pixels by 16 lines and the color difference signals corresponding to the luminance signals; and sends them as macroblock data D2 to an operation circuit 12 and to a motion-vector detection section 23.

The motion-vector detection section 23 calculates the motion vector of each macroblock in the macroblock data D2 according to the macroblock data D2 and reference image data D14 stored in a frame memory 21.

The operation circuit 12 applies motion compensation in a mode selected from an intra mode, a forward-direction predictive mode, a backward-direction predictive mode, and a bidirectional predictive mode to the macroblock data D2 sent from the pre-processing section 11 according to the picture type of each macroblock in the macroblock data D2. The intra mode refers to a method in which a frame picture to be encoded is sent as is as transfer data. The forward-direction predictive mode refers to a method in which a predictive difference between a frame picture to be encoded and a past reference picture is sent as transfer data. The backward-direction predictive mode refers to a method in which a predictive difference between a frame picture to be encoded and a future reference picture is sent as transfer data. The bidirectional predictive mode refers to a method in which a predictive difference between a frame picture to be encoded and the average of two predictive pictures, a past reference picture and a future reference picture, is sent as transfer data.

A case in which the macroblock data D2 is an I picture will be described first. In this case, the macroblock data D2 is processed in the intra mode. Specifically, the operation circuit 12 sends the macroblocks of the macroblock data D2 to a discrete cosine transform (DCT) section 13 as is as operation data D3. The DCT section 13 applies DCT processing to the operation data D3 to generate DCT coefficients, and sends them to a quantization section 14 as DCT-coefficient data D4. The quantization section 14 applies quantization processing to the DCT-coefficient data D4 and sends quantized DCT-coefficient data D5 to a VLC section 15 and to an inverse quantization section 18. The quantization section 14 adjusts a quantization step size in the quantization processing according to a quantization control value D21 sent from the information-amount controller 110 shown in FIG. 1 to control the amount of generated codes.

The inverse quantization section 18 applies inverse quantization processing to the quantized DCT-coefficient data D5 and sends the result to an inverse DCT section 19 as DCT-coefficient data D11. The inverse DCT section 19 applies inverse DCT processing to the DCT-coefficient data D11, and sends the result to an operation circuit 20 as operation data D12. The frame memory 21 stores the result as reference picture data D13.

A case in which the macroblock data D2 is a P picture will be described next. In this case, the operation circuit 12 applies motion-compensation processing to the macroblock data D2 either in the intra mode or in the forward-direction predictive mode.

When the intra mode is used, the operation circuit 12 sends the macroblock data D2 to the DCT section 13 as is as the operation data D3.

When the forward-direction predictive mode is used, the operation circuit 12 applies subtraction processing to the macroblock data 02 with the use of forward-direction predictive picture data 017 sent from a motion compensation section 22.

Motion compensation is applied to the reference picture data D13 stored in the frame memory 21 according to motion-vector data D18 to calculate the forward-direction predictive picture data D17. More specifically, the motion compensation section 22 shifts reading addresses of the frame memory 21 according to the motion-vector data D18 in the forward-direction predictive mode, reads the reference picture data D13, and sends it to the operation circuit 12 and to the operation circuit 20 as the forward-direction predictive picture data D17. The operation circuit 12 subtracts the forward-direction predictive picture data D17 from the macroblock data D2 to obtain difference data as a predictive difference, and sends it to the DCT section 13 as the operation data D3.

The operation circuit 20 adds the forward-direction predictive picture data D17 sent from the motion compensation section 22 to the operation data D12 to partially reproduce the reference picture data D13 (P picture). The data is stored in the frame memory 21.

A case in which the pre-processing section 11 sends macroblock data D2 formed of a B picture to the operation circuit 12 will be described next. In this case, the operation circuit 12 applies motion compensation in a mode selected from the intra mode, the forward-direction predictive mode, the backward-direction predictive mode, and the bidirectional predictive mode.

When the intra mode or the forward-direction predictive mode is used, the same processing as that for a P picture, described above, is applied to the macroblock data D2. Since a B picture is not used as a predictive reference picture, the reference picture data D13 is not stored in the frame memory 21.

When the backward-direction predictive mode is used, the operation circuit 12 applies subtraction processing to the macroblock data 02 by the use of backward-direction predictive picture data 016 sent from the motion compensation section 22.

Motion compensation is applied to the reference picture data D13 stored in the frame memory 21 according to motion-vector data D18 to calculate the backward-direction predictive picture data D16. More specifically, the motion compensation section 22 shifts reading addresses of the frame memory 21 according to the motion-vector data D18 in the backward-direction predictive mode, reads the reference picture data D13, and sends it to the operation circuit 12 and to the operation circuit 20 as the backward-direction predictive picture data D16. The operation circuit 12 subtracts the backward-direction predictive picture data D16 from the macroblock data D2 to obtain difference data as a predictive difference, and sends it to the DCT section 13 as the operation data D3.

The operation circuit 20 adds the backward-direction predictive picture data D16 sent from the motion compensation section 22 to the operation data D12 to partially reproduce the reference picture data D13 (B picture). Since a B picture is not used as a predictive reference picture, the reference picture data D13 is not stored in the frame memory 21.

When the bidirectional predictive mode is used, the operation circuit 12 subtracts the average of the forward-direction predictive picture data D17 and the backward-direction predictive picture data D16 sent from the motion compensation section 22, from the macroblock data D2 to obtain difference data as a predictive difference, and sends it to the DCT section 13 as the operation data D3.

The operation circuit 20 adds the average of the forward-direction predictive picture data D17 and the backward-direction predictive picture data D16 sent from the motion compensation section 22, to the operation data D12 to generate the reference predictive data D13 (B picture). Since a B picture is not used as a predictive reference picture, the reference picture data D13 is not stored in the frame memory 21.

As described above, the motion-compensation predictive processing, the DCT processing, and the quantization processing are applied to the image data D1 input to the MPEG-2 encoder 101, and the quantized DCT-coefficient data D5 is sent to the VLC section 15.

The VLC section 15 applies variable-length encoding processing based on a predetermined conversion table to the quantized DCT-coefficient data D5, and sends the resultant data to the data buffer 102 shown in FIG. 1 as variable-length encoding data D6.

Referring again to FIG. 1, since the MPEG-2 encoder 101 performs variable-length encoding in its last stage, output data is in a burst form (not continuous). ESs generated by the MPEG-2 encoder 101 are sequentially written into the data buffer 102, stored in the data buffer 102 for more than a predetermined period, and read.

With this operation, although the ESs input to the data buffer 102 are in a burst form, data is read from the data buffer 102 at a constant rate. The data buffer 102 functions in this way to transfer information at a fixed rate.

To avoid an overflow and an underflow in the data buffer 102, the information-amount controller 110 monitors a data occupation rate in the data buffer 102, generates a quantization control value D21 for the MPEG-2 encoder 101 according to the data occupation rate, and sends it to the quantization section 14 of the MPEG 2 encoder 101.

The ESs output from the MPEG-2 encoder 101 are also input to the header detector 103. The header detector 103 detects a header which partitions ES data to be stored in one PES. The detected header is picture_data, which partitions a picture to be stored in one PES.

The counter 104 counts the number of data items in an ES sent from the MPEG-2 encoder 101, and is reset to zero by a PES-start signal A, described later. The data length of ESs to be stored in one PES is obtained from the counter 104. The count is input to the count detecting circuit 108. The count detecting circuit 108 determines whether the input value matches 0xffff.

The outputs of the header detector 103 and the count detecting circuit 108 are input to the OR circuit 109, "OR" processed, and output as the PES-start signal A. This PES-start signal A is used as a reset signal for the counter 104. The PES-start signal A is also sent to the data buffer 102 together with ES data sent from the MPEG-2 encoder 101, and used as a partition signal (PES-start signal B) for attaching a PES header.

The PES-start signal A is also used by the memory controller 106 when the data length obtained by the counter 104 is written into the memory 105, as described later.

A value to be stored in PES_packet_length is actually obtained in this way and written into the memory 105 for each PES. The memory 105 is controlled by the memory controller 106, described later.

The PES-start signal B controls reading of ES data from the data buffer 102, and data to be stored in each PES is input to the PES-header attaching section 107. The memory controller 106 controls reading of a data length from the memory 105 according to the PES-start signal B. The data length corresponding to ES data read from the data buffer 102 is read and input to the PES-header attaching section 107.

The PES-header attaching section 107 generates a PES header using the data length sent from the memory 105, and attaches the header to the data sent from the data buffer 102. By this operation, a PES is generated from the ES data and is sent to the TS generator 111.

As described above, according to the present embodiment, the PES-start signal A becomes active when picture_header is detected in ES data sent from the MPEG-2 encoder 101 or when the count of the counter 104 reaches 0xffff. As a result, when the data length of picture data to be stored in a PES is equal to or smaller than 0xffff, the entire picture data is stored in one PES. When the data length exceeds 0xffff, picture data having a data length of 0xffff, which starts at picture_header and ends at a point where the data length reaches 0xffff, is stored in one PES, and the rest of the picture data is stored in another PES until the next picture_header appears. In this case, if the data length of picture data to be stored in the another PES again reaches 0xffff, still another PES is generated in the same way.

The TS generator III divides one PES by the number of data items which can be stored in a TS packet, 182 bytes, and stores the data in a plurality of TS packets. If a PES does not reach 182 bytes in the last TS packet, stuffing bytes are inserted before the PES data (more precisely, immediately after a TS header) to fill the last TS packet.

The amount of required stuffing bytes is determined by PES_packet_length of the PES header. In the present embodiment, as described above, because 0x0000 is not used in PES_packet_length, which means a data length is not clear, the data length of the PES packet may always be determined. Therefore, the amount of required stuffing bytes always can be determined from PES_packet_length.

Packetized data generated by the TS generator 111 is sent externally, and can be recorded into a recording medium, such as a hard disk or a memory, by a recording circuit 112.

Figure 3:
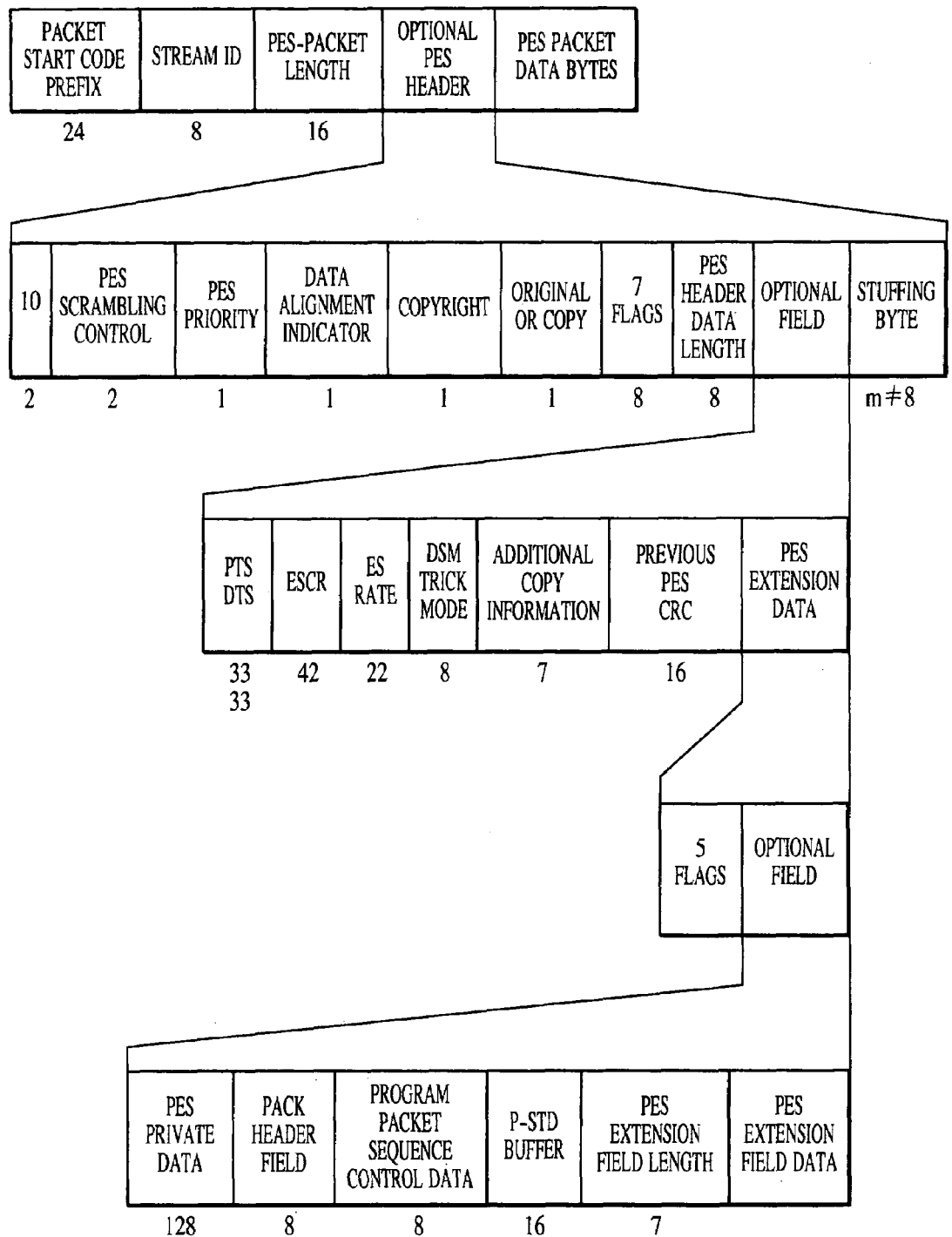
FIG. 3 is a view showing the data structure of a PES packet in the MPEG-2 method according to the embodiment of the present invention.

FIG. 3 shows a specific structure of a PES packet output from the PES-header attaching section 107.

A PES packet is formed of a 24-bit packet start code prefix, an eight-bit stream ID, a 16-bit PES packet length (PES_packet_length) indicating the length of the packet, an optional PES header, and PES packet data bytes.

The optional PES header includes two-bit data, "10," which differentiates the MPEG-2 method from a MPEG-1 method; a two-bit PES scrambling control flag indicating the use and the type of scramble in the packet; a one-bit PES priority flag indicating the priority of the packet; a data alignment indicator for data arrangement display; a one-bit copyright flag indicating whether a copyright is held; various flags, such as a presentation time stamp (PTS) flag, a decoding time stamp (DTS) flag, an elementary-stream (ES) rate flag, a digital-storage-media (DSM) trick mode flag, an additional copy information flag, a previous-packet cyclic redundancy code (CRC), and a PES extension flag; a PES-header data length; an optional field; and stuffing bytes.

The optional field is formed of a presentation time stamp (PTS), a decoding time stamp (DTS), an elementary-stream (ES) rate, a digital-storage-media (DSM) trick mode, additional copy information, a previous PES cyclic redundancy code (CRC), and a PES extension data, which correspond to the above various flags.

The PES extension data includes five flags and an optional field. The optional field of the PES extension data is formed of 128-bit PES private data, an eight-bit pack header field, eight-bit program packet sequence control data, a 16-bit P-STD buffer, a seven-bit PES extension field length, and PES extension field data.

Figure 4:
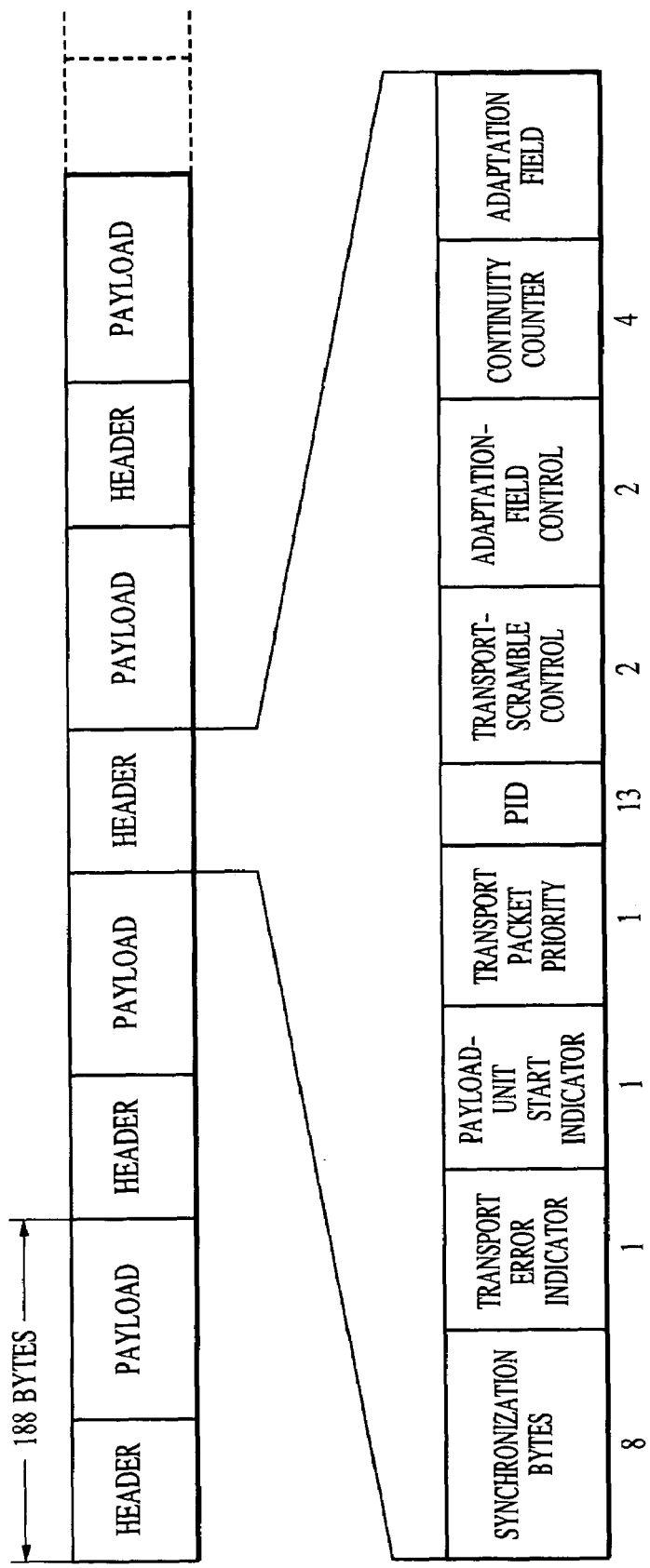
FIG. 4 is a view showing the data structure of a TS packet in the MPEG-2 method according to the embodiment of the present invention.

FIG. 4 shows a structure of a TS packet output from the TS generator 111.

As shown in FIG. 4, a header is provided at the top of a TS, and a payload (information) follows. The header is formed of synchronization bytes, a transport error indicator indicating whether an error occurs in the packet, a payload-unit start indicator indicating the start of a payload unit, a transport packet priority indicating the degree of the importance of the packet, packet identification information (PID) indicating the attribute of an individual stream in the packet, a transport scramble control indicating the use and the type of scramble for a payload, an adaptation-field control indicating the use of an adaptation field, a continuity counter for determining whether the packet is discarded at the middle, and an adaptation field in which additional information related to the individual stream and stuffing bytes can be placed.

Second Embodiment

Figure 5:
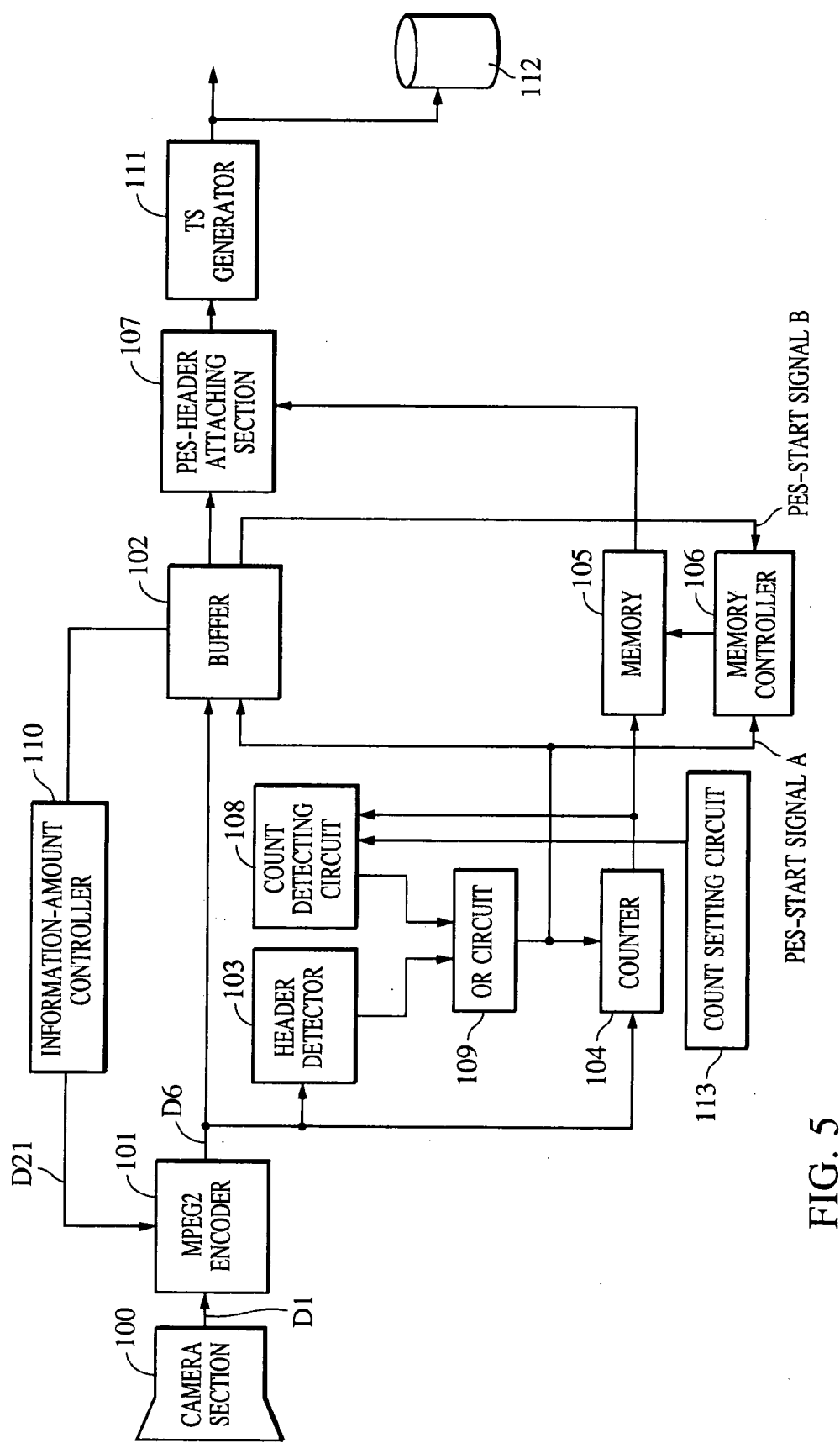
FIG. 5 is a block diagram of an image encoding apparatus for packetizing elementary streams according to another embodiment of the present invention.

FIG. 5 is a block diagram of an image encoding apparatus for packetizing elementary streams according to a second embodiment of the present invention.

In the first embodiment, the maximum length of a PES packet is fixed to 0xffff. In the second embodiment, the length of a PES packet can be set to any value within a range not exceeding 0xffff. Since the other structures of the second embodiment is the same as those of the first embodiment, descriptions thereof will be omitted.

In FIG. 5, in addition to the structure elements shown in FIG. 1, a count setting circuit 113 is further provided for setting the target value of the count detecting circuit 108.

The count setting circuit 113 specifies the target value of the count detecting circuit 108. In other words, the length of a PES packet can be set to a desired length in the present embodiment.

Other Embodiments

Storage media according to other embodiments of the present invention will be described next.

The present invention can be implemented by a hardware structure. It can also be achieved by a computer system having a CPU and a memory. When such a computer system is used, the memory serves as the storage medium specified in the present invention. More specifically, a storage medium which stores the program codes of software that executes the operations described in the above embodiments is used in a system or in an apparatus, and a CPU of the system or the apparatus reads the program codes stored in the storage medium, and executes them to achieve the object of the present invention.

Storage media include semiconductor memories, such as ROMs and RAMs, optical disks, magneto-optical disks, and magnetic media. They can be used in forms of CD-ROMs, floppy disks, magnetic tapes, magnetic cards, and non-volatile memory cards.

Therefore, it is possible that such a storage medium may be used in a system or in an apparatus other than those shown in FIG. 1, and the system or the apparatus reads the program codes stored in the storage medium and executes them to perform the same functions as in the above embodiments and to obtain the same advantages. The object of the present invention is thus achieved.

When an operating system running on a computer performs a part or the whole of the processing; or when program codes read from a storage medium are written into a memory provided for an extension function board inserted into a computer or an extension function unit connected to the computer, and a CPU provided for the extension function board or the extension function unit performs a part or the whole of the processing according to the program codes, the same functions as in the above embodiments and the same advantages are obtained. The object of the present invention is thus achieved.

In other words, the foregoing description of embodiments has been given for illustrative purposes only and not to be construed as imposing any limitation in every respect.

The scope of the invention is, therefore, to be determined solely by the following claims and not limited by the text of the specifications and alternatives made within a scope equivalent to the scope of the claims fall within the true spirit and scope of the invention.

What is claimed is:

1. An encoding apparatus for variable length packetizing variable-length encoding image data by a packet format in which a header of a packet has a code area indicating the value of packet length, wherein the code area describes a code indicating a packet length in a case where the packet length is less than or equal to a predetermined value, and describes a code indicating not to decide a packet length in a case where the packet length is larger than the predetermined value, comprising:
   a) inputting means for inputting variable-length encoding image data which includes a picture header indicating the start of one picture;
   b) header detecting means for detecting the picture header input by said inputting means;
   c) data length detecting means for detecting whether a data length of variable length encoding image data for one frame input by said inputting means reaches the predetermined value; and
   d) packetizing means for variable-length packetizing the variable-length encoding image data in accordance with output of said header detecting means and said data length detecting means,
   wherein said packetizing means divides the one frame into the predetermined value and performs packetizing in the case where the data length of variable-length encoding image data of the one frame is larger than the predetermined value, and performs packetizing without dividing the variable-length encoding image data in the case where the data length of variable length encoding image data of the one frame is less than the predetermined value.

2. An encoding apparatus according to claim 1, wherein said packetizing means generates a PES packet corresponding to data conforming to an MPEG system from the variable-length encoding image data.

3. An encoding apparatus according to claim 2, further comprising second packetizing means for applying second packetization to packet data packetized by said packetizing means, by a predetermined data length.

4. An encoding apparatus according to claim 3, wherein a packet generated by said second packetizing means is a TS packet.

5. An encoding apparatus according to claim 4, further comprising pickup means for capturing an image of an object and for generating image data; and
   encoding means for applying variable-length encoding to the image data.

6. An encoding apparatus according to claim 1, further comprising recording means for recording the variable-length encoding image data packetized by said packetizing means into a recording medium.

7. An encoding method for variable-length packetizing variable-length encoding image data by a packet format in which a header of a packet has a code area indicating a value of packet length, wherein the code area describes a code indicating a packet length in a case where the packet length is less than or equal to a predetermined value, and describes a code indicating not to decide a packet length in a case where the packet length is larger than the predetermined value, comprising the steps of:
   an inputting step of inputting variable-length encoding image data which includes a picture header indicating the start of one picture;
   a first detecting step of detecting the picture header input in said inputting step;
   a second detecting step of detecting whether a data length of variable length encoding image data for one frame input in said inputting step reaches the predetermined value; and
   variable-length packetizing the variable-length encoding image data in accordance with an output of said first and second detecting steps,
   wherein the variable length packetizing divides the one frame into the predetermined value and performs packetizing in the case where the data length of variable-length encoding image data of the one frame is larger than the predetermined value, and performs packetizing without dividing the variable-length encoding image data in the case where the data length of variable length encoding image data of the one frame is less than the predetermined value.

8. A recording medium which can be read by a computer and which records a program for variable-length packetizing variable-length encoding image data by a packet format in which a header of a packet has a code area indicating a value of packet length, wherein the code area describes a code indicating a packet length in a case where the packet length is less than or equal to a predetermined value, and describes a code indicating not to decide a packet length in a case where the packet length is larger than the predetermined value, the program comprising codes to perform:
   input processing for inputting variable-length encoding image data which includes a picture header indicating the start of one picture;
   first detection processing for detecting the picture header input by said input processing;
   second detection processing for detecting whether a data length of variable-length encoding image data for one frame input by said input processing reaches the predetermined value; and
   packetizing processing for variable-length packetizing the variable-length encoding image data in accordance with output of said first and second detection processing,
   wherein said packetizing processing divides the one frame into the predetermined value and performs packetizing in the case where the data length of variable-length encoding image data of the one frame is larger than the predetermined value, and performs packetizing without dividing the variable-length encoding image data in the case where the data length of variable length encoding image data of the one frame is less than the predetermined value.

9. An encoding apparatus for variable-length packetizing variable-length encoding image data by a packet format in which a header of a packet has a code area indicating the value of packet length, wherein the code area describes a code indicating a packet length in a case where the packet length is less than or equal to a predetermined value, and describes a code indicating not to decide a packet length in a case where the packet length is larger than the predetermined value, comprising:
   an inputting unit that inputs variable-length encoding image data which includes a picture header indicating the start of one picture;

a header detecting unit that detects the picture header input by said inputting unit;

a data length detecting unit that detects whether a data length of variable-length encoding image data for one frame input by said inputting means reaches the predetermined value; and a packetizing unit that variable-length packetizes the variable-length encoding image data in accordance with an output of said header detecting unit and said data length detecting unit, wherein said packetizing unit divides the one frame into the predetermined value and performs packetizing in the case where the data length of variable-length encoding image data of the one frame is larger than the predetermined value, and performs packetizing without dividing the variable-length encoding image data in the case where the data length of variable length encoding image data of the one frame is less than the predetermined value.

* * * * *

UNITED STATES PATENT AND TRADEMARK OFFICE
CERTIFICATE OF CORRECTION

PATENT NO. : 6,950,443 B1 Page 1 of 1
DATED : September 27, 2005
INVENTOR(S) : Yushi Kaneko It is certified that error appears in the above-identified patent and that said Letters Patent is hereby corrected as shown below:

Column 4,
Line 54, "02" should read -- D2 --.

Column 5,
Line 24, "02" should read -- D2 --.

Column 7,
Line 10, "III" should read -- 111 --.

Signed and Sealed this

Sixteenth Day of May, 2006

JON W. DUDAS
*Director of the United States Patent and Trademark Office*